Figure 1:
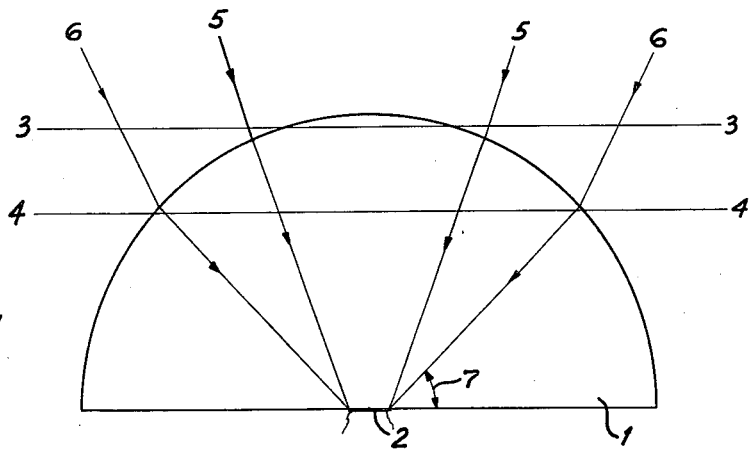

Oct. 16, 1962     T. F. McHENRY     3,059,113

FOLDED IMMERSED BOLOMETER

Filed May 25, 1960

INVENTOR
THOMAS F. McHENRY
BY Robert Ames Norton
ATTORNEY

United States Patent Office 3,059,113
Patented Oct. 16, 1962

3,059,113
FOLDED IMMERSED BOLOMETER
Thomas F. McHenry, South Norwalk, Conn., assignor to Barnes Engineering Company, Stamford, Conn., a corporation of Delaware
Filed May 25, 1960, Ser. No. 31,584
8 Claims. (Cl. 250—83)

This invention relates to immersed detectors for infrared radiation and especially to immersed thermistor bolometers.

Infrared detectors in general are often used at the limit of sensitivity and so maximum efficiency in the gathering of radiation is of great importance. It has thus become common to immerse the detector, that is to say, embed the detector on a suitable lens which results in an optical gain which is a function of the refractive index of the immersion medium. The nature of the detector is not particularly important and it may be photoconductive or a thermal detector such as a thermistor. In both cases the gain from immersion is realized. As the present invention is particularly important with thermistor bolometers, the remainder of the description will be made in terms of a thermistor bolometer although it should be understood that the invention is in no sense limited thereto and other types of radiation detectors such as lead sulfide, lead selenide, indium antimonide and the like may be used wherever the requirements of the problem make them suitable.

For use in the infrared there are available lens materials of extremely high useful refractive index. For example, germanium is useful and has an index of four. Silicon is likewise a valuable material and has an index in excess of three. With small lenses no problem is presented and a very great improvement in sensitivity is achieved. However, for some purposes relatively large lenses, up to several inches, are needed and serious problems are encountered. The first and most immediate problem is economic. Optical grades of germanium and silicon are quite expensive and very large lenses, for example, hemispheres of germanium several inches in diameter, greatly increase the cost of instrumentation and present some problems in manufacture. The second drawback is that the big lens is quite heavy and for many instruments the lens and associated immersed detector must be oscillated in order to interrupt or chop the radiation. This immediately presents a serious problem with very big lenses because the inertia of rapidly moving or oscillating parts can introduce serious problems in vibration, wear and reliability. As some instruments utilizing infrared have to be capable of unattended use for months or years this is a very real problem.

Another drawback which flows from the great weight of large lenses is the cooling problem. Many detectors of the photoconductive type require drastic cooling, for example, with liquid nitrogen or even in some cases liquid helium, in order to have adequate sensitivity in certain infrared regions. The problem of cooling becomes extremely serious when a large lens is used as the heat capacity and large radiating surface may cause prohibitively high demands on the cooling equipment. This is particularly serious with air-borne or satellite equipment where power supply weight is a vital consideration.

The drawbacks enumerated above render equipment less effective or very expensive and the elimination of these drawbacks by means of the present invention results in an improved operation but not in any qualitative difference in optical behavior. The improved manner of producing an otherwise achievable result represents a distinct advance in the art. In addition, in a more specific aspect of the present invention, it is also possible to obtain a greater optical result thus producing a new result rather than an old result in an improved and more efficient manner.

Figure 2:
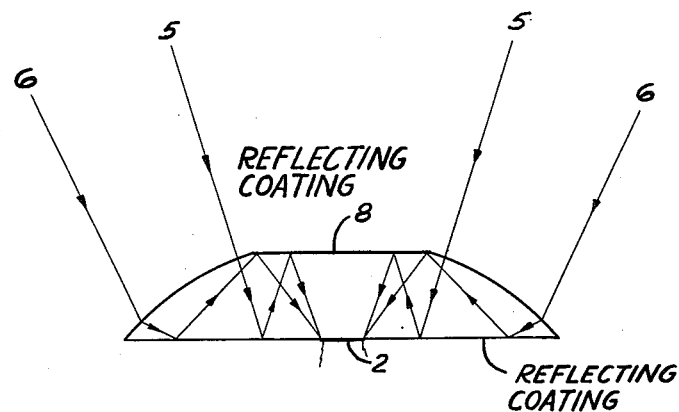
Figure 3:
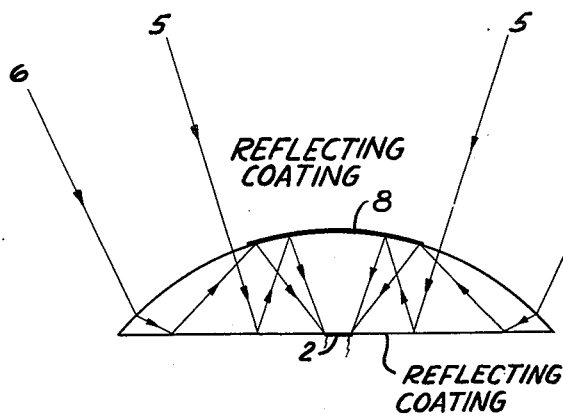

Essentially the present invention cuts a slice of accurately predetermined dimensions from a big lens and then folds the light path by suitable reflecting surfaces so that the thin lens produces substantially the same result as the much bigger uncut lens. The invention will be described in more detail in conjunction with the drawings in which:

FIG. 1 is a section through a hemispherical immersed detector showing rays and location of cut;
FIG. 2 is a section through the cut portion, and
FIG. 3 is a section through a modified lens.

In FIG. 1 is shown a conventional full immersion detector. The lens, for example of germanium, is shown at 1. The detector, illustrated as a thermistor at 2, and two planes where cuts are to be made at 3 and 4. Two pairs of rays 5 and 6 illustrate how the immersion of the detector in the lens increases the radiation gathering power. For a given detector size the rays 6 represent the boundary rays for the particular detector and material in question. The critical angle between the plane face of the sphere and the boundary rays is shown at 7.

FIG. 2 shows the cut lens of the present invention and a tracing of the same two pairs of rays. The flat surface produced by the cut 3 is shown at 8 and is silvered or otherwise provided with a totally reflecting backing. Similarly the flat surface 9 obtained by the cut 4 is also silvered except for the area occupied by the detector 2. A moment's consideration of the rays in FIG. 2 shows that the same total field of view represented by the boundary rays 6 still strikes the detector. The path of the rays in the lens, however, is folded and in the case in question the cut at 4 is two-thirds of the way up from the flat surface of the hemisphere in order to produce folded paths of the same length which is required. The cut 3 is determined by the size of the detector. The smaller the detector the smaller the mirror surface 8.

It will be apparent that the amount of lens material is very greatly reduced with corresponding saving in weight and saving in cost. At first glance it might appear that there is considerable loss because rays striking the silvered surface 8 do not pass into the lens. While theoretically this is so as a practical matter the loss is negligible. A common form of collecting optics for infrared is a pair of Cassegrain mirrors. In such a system the secondary mirror produces some obscuration and blocks a portion of the radiant energy. It will be found in most cases that the rays which would ordinarily strike the silvered surface 8 are those which are obscured anyway by the secondary mirror. In any event, the area reduction caused by obscuration of a small circle within a large one goes as the ratio of the squares of the respective radii. This will be small.

It should be clearly understood that, though reference has been made to "slicing" the large immersion lens, this approach was made to clearly and simply describe this invention and the advantage afforded in material saving. Ordinarily, the immersion lens will be manufactured from a blank but little larger than the final optic.

Thus, it is unnecessary to procure the perhaps prohibitively expensive, large ingots of germanium, silicon, or other immersion material in the first place. A crystal of germanium three inches thick is much more than three times as expensive as one but one inch thick.

Various means have been employed to reduce detector size. One way of accomplishing this is to provide large energy gathering optics of moderate speed and increase the speed of the system beyond that which is possible with an ordinary immersed detector by using a hyperimmersed detector which may be considered as a detector with a spherical portion in the lens and a greater distance from the lens periphery to the detector so that it is beyond the center of curvature of the spherical portion of the lens. This further shortens the focal length of the whole system and reduces detector size. Such an improved system is described and claimed in the copending application of Hall and Fisher, Serial No. 9,484 filed February 18, 1960. In the present invention it is possible to achieve a similar effect of smaller detector size and this is shown in FIG. 3 where the upper surface 9 is curved or to put it another way has some optical power. This further converges the folded rays and, as will be seen, permits use of a smaller detector. It is true that the total mass of the lens is slightly increased thereby but the increase is very small in comparison to the increased detectivity which is made possible by the converging effect of the curved reflecting surface.

It will be noted that the drawings in the present case are diagrammatic because the invention is not concerned with particular detector design. Accordingly, the detector 2 has been shown as one element. Actually, of course, when germanium or silicon is used with a thermistor detector it is necessary to interpose a very thin film of insulating materials such as selenium. Otherwise the thermistor would be short circuited by the germanium or silicon lens. This is conventional practice and, of course, is used in the present invention also. Where other lenses are employed using materials which are not conductors, for example, lenses of barium titanate, no insulation is necessary and so a small loss due to the fact that the insulator has a somewhat lower refractive index than the lens material itself is not encountered.

It will be noted that in common with other immersed detectors the lens performs two functions. One is to converge the rays of infrared light and the other is to act as a heat sink. This is true of all immersed detectors where the lens material has good heat conductivity and it does not constitute a novel feature of the present invention. It is merely mentioned here to point out that the present invention retains all of the advantages of ordinary immersed detectors and in no way introduces disadvantages.

Where very thin thermistor detectors are used, for example, thin slices of semiconductors such as germanium and silicon the thermistor may be partly or wholly transparent. In such a case the lower side of the thermistor may be suitably blackened, or if it is desired to produce a selective detector a selectively absorbing layer may be provided so that the transparent detector is heated up only by the energy absorbed by the selective absorbing coating. This latter feature is not a part of the novelty of the present invention but constitutes the subject matter of the United States Patent of De Waard, No. 2,994,053, dated July 25, 1961. It is, however, an advantage of the present invention that selective immersed detectors can be produced with all of the advantages of the folded energy path which constitutes the novel feature of the present invention.

Germanium and silicon, the preferred lens materials of the present invention, are typical representatives of the semiconductor elements of group IV–A of the periodic system. The other semiconductor element, carbon, is also a good lens material in its crystalline form as a diamond but because of its cost is not so generally used in infrared optics. The present invention which drastically reduces the size of an immersion lens, is even more important in diamond lenses where these are used for special instruments, ordinarily in the far infrared.

I claim:

1. An immersed detector comprising in combination and in optical alignment a lens having an annular spherical surface, a nonspherical bottom surface, an infrared detector immersed in the center of the bottom surface, the remainder of the bottom surface being provided with an infrared reflecting coating and an upper reflecting surface spaced from the lower surface so that rays striking the spherical surface are refracted and reflected onto the detector.

2. An immersed detector according to claim 1 in which the detector is a thermistor.

3. An immersed detector according to claim 1 in which the lens is of a semiconductor element of group IV–A of the periodic system having a high refractive index and transparent in the infrared.

4. An immersed detector according to claim 3 in which the lens is of germanium.

5. An immersed detector according to claim 1 in which the upper and lower surfaces are flat.

6. An immersed detector according to claim 2 in which the upper and lower surfaces are flat.

7. An immersed detector according to claim 1 in which the upper reflecting surface is concave.

8. An immersed detector according to claim 2 in which the upper reflecting surface is concave.

References Cited in the file of this patent

UNITED STATES PATENTS

| | | |
|---|---|---|
| 2,544,261 | Gibson | Mar. 6, 1951 |
| 2,659,271 | Treuting | Nov. 17, 1953 |
| 2,964,636 | Cary | Dec. 13, 1960 |